Aug. 17, 1943.  A. A. ANDERSON  2,326,916
AUTOMATIC ADHESIVE TAPE DISPENSER
Filed July 4, 1942   2 Sheets-Sheet 2
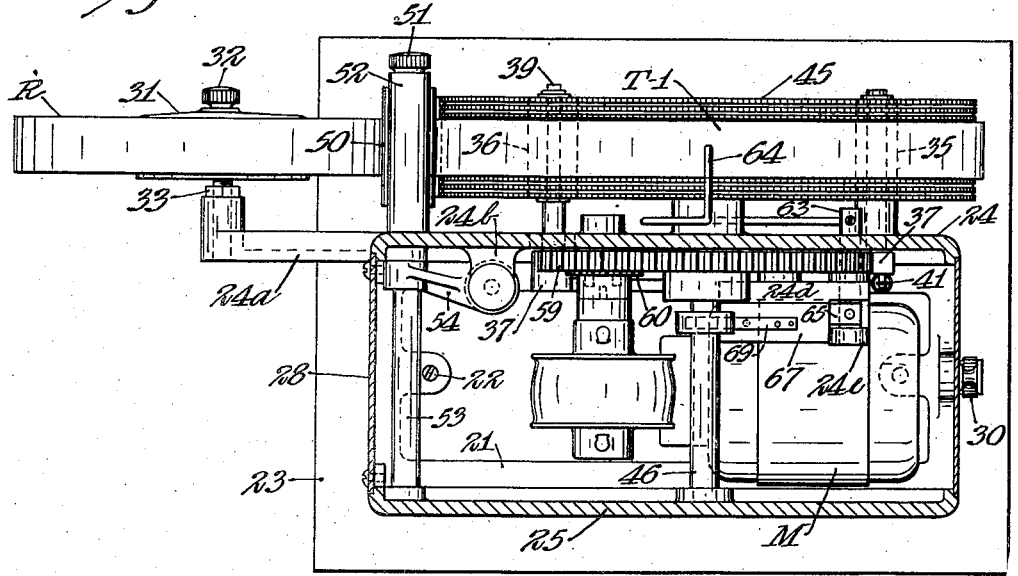
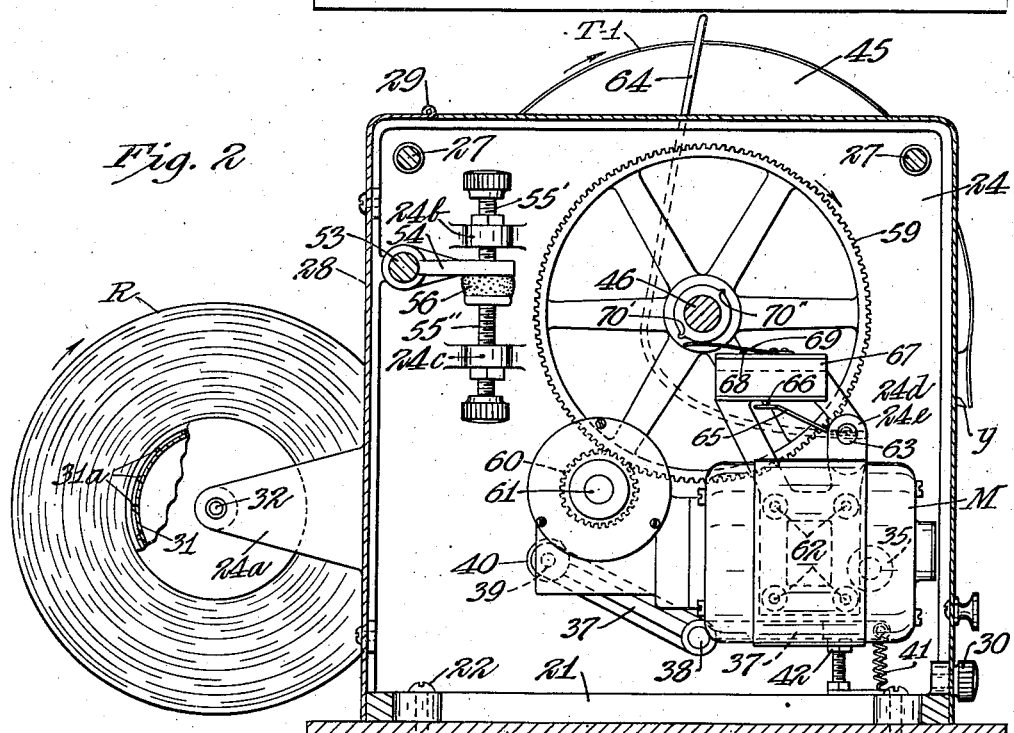
Inventor
Arthur A. Anderson
By Carpenter, Abbott, Coulter & Kinney
Attorneys Patented Aug. 17, 1943

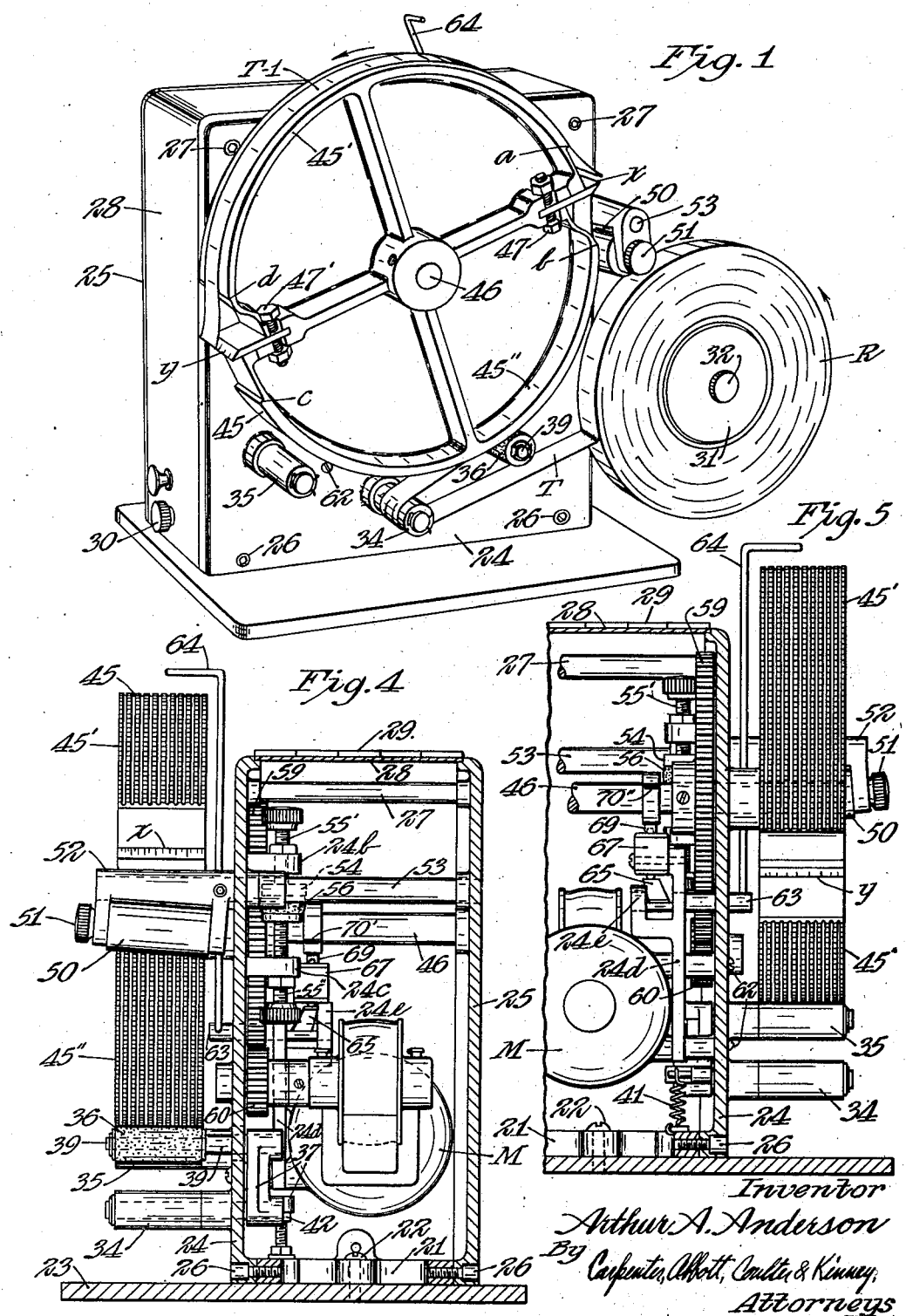

2,326,916

UNITED STATES PATENT OFFICE 2,326,916

AUTOMATIC ADHESIVE TAPE DISPENSER

Arthur A. Anderson, Rose Township, Ramsey County, Minn., assignor to Minnesota Mining & Manufacturing Company, St. Paul, Minn., a corporation of Delaware Application July 4, 1942, Serial No. 449,768

3 Claims. (Cl. 164—68)

This invention relates to dispensers for pressure-sensitive adhesive tape which is normally tacky without the necessity of being activated by solvents or heat.

An object is to provide an automatic motor-driven adhesive tape dispenser which will withdraw tape from a roll thereof, sever it into predetermined lengths, and successively position each severed length at a dispensing station so that it may be readily grasped and removed whenever desired.

The problem of providing a dispenser of this type which is adapted for handling pressure-sensitive tape is not a simple one. Such adhesive tape is ever-tacky and sticks to whatever the adhesive surface touches, which makes it difficult to handle.

This invention provides a novel species of tape dispenser of the class broadly described and claimed in my co-pending application Serial No. 400,143 filed June 27, 1941. The latter provides, inter alia, a holder for a supply roll of the tape, a wheel equipped with severing means and tape-carrying means, and complementary severing means adjacent the wheel which coacts with the severing means on the wheel to cut the tape into desired lengths when the wheel turns with the tape trained around it.

The embodiment desired in my said application Serial No. 400,143 is especially adapted to the dispensing of relatively short pieces of tape, and relatively long lengths of tape could not be handled unless the wheel were of such great size as to be impracticable, i. e., such previously described dispenser is especially adapted to dispensing tape in relatively short lengths (such as from ½" to 5") rather than in relatively long lengths (such as from 6" to 20"). Such previous type of dispenser can be built to dispense any length, but long lengths would require cutter wheels of such great size that the machine would be unwieldy and expensive.

Therefore further objects of this invention include:

The provision of an automatic device for dispensing accurately measured predetermined lengths of pressure-sensitive adhesive tape in rapid succession, capable of dispensing portions which may be of any length but particularly suited to dispense portions that are of substantial length, such as of the order of 5 to 20 inches or longer; and The provision of a dispenser which permits the dispensed length to be grasped either at one end or at both ends simultaneously.

The present invention provides a rotatable draft wheel whose rim or periphery is adapted to receive tape from a supply roll thereof and to hold the tape sufficiently to withdraw it from the roll when the wheel rotates with the tape trained around the wheel. The wheel has a plurality of recesses in its periphery adapted to receive severing elements which are positioned therein so as to underlie the tape and so as to coact with a complementary severing element that is located adjacent to the wheel so that as the wheel turns the tape is severed with the severed length still being held by the periphery.

The periphery of the cutter wheel holds the pressure-sensitive tape by reason of its temporary adherence to the tacky surface thereof.

There may be any number of recesses and any number of severing elements carried on the wheel, the latter usually being spaced an equal distance apart. (In the embodiment illustrated herein there are two recesses which extend across the width of the wheel so as to divide the periphery into two tape-carrying segments, and there are two equi-distant severing elements, one in each recess.)

The recesses are preferably of a size and shape to provide a space underlying the tape to facilitate removal thereof. If the space extends on but one side of a severing element, the severed tape will ordinarily have but one of its ends free from contact with the wheel; if the space extends on both sides (as in the illustrated machine) both ends of the severed tape will ordinarily be free.

Severed lengths may be removed manually. Also they may be removed by mechanical means, as when dispensing units embodying this invention are built into or connected with, packaging, wrapping, tying, labeling or other machines.

The severing elements on the wheel may be severing edges and the complementary severing means adjacent the wheel may be an anvil member (such as the rotatable cylinder illustrated herein) against which the edges press successively as the wheel turns.

Power driving means may be employed for intermittent operation of the dispenser in dispensing cycles whereby successive pieces of severed tape are brought to rest at a dispensing station in step-by-step fashion, including control means adapted to be actuated in response to the removal of a severed length of tape, so that upon such removal the dispenser is automatically set in motion to dispense the next length of tape (as broadly described in my copending application Serial No. 428,200 filed January 26, 1942). Such power driving means may include an electric motor and the control means may include a switch in the circuit of the motor adapted to be closed in response to removal of the cut length of tape.

The specific machine that is described and illustrated in the following description and drawings as illustrative of my invention is a portable electrically operated automatic tape dispenser which operates intermittently in dispensing cycles whereby successive pieces of severed tape are brought to rest at a dispensing station in step-by-step fashion, particularly suited for use in factory assembly lines, stores, studios, offices, workshops, shipping rooms, packing rooms, etc., for rapid provision of accurately measured predetermined lengths of pressure-sensitive adhesive tape of any desired length but particularly relatively long lengths of the order of 5 to 20 inches or more, for sealing and/or labeling packages, boxes, folders, bags, bottles, cards, cartons and other objects, and for securing or tying together a plurality of objects in a bundle or group to form a single package or unit.

In the accompanying drawings and description the side of the machine at which the operator stands when facing the machine to operate it is called the front, and the terms "right" and "left" are from the point of view of such operator.

Figure 1 is a perspective view of the machine as the operator sees it, looking at the front of the machine.

Figure 2 is a rear elevation with the rear upright plate broken away.

Figure 3 is a plan view with the top of the casing broken away.

Figure 4 is a right side elevation with the right side of the casing and the supply roll of tape broken away.

Figure 5 is a partial left side elevation with the left side of the casing and part of the rear of the machine broken away.

Figure 6 is a wiring diagram.

To the base 21 (which is attached by screws 22 to the portable platform 23) are rigidly attached the upright front plate 24 and upright rear plate 25 by the screws 26. The plates are parallel and their upper ends are fixed in spaced relationship to each other by the combination bolts and spacer bars 27. All parts of the machine are supported directly or indirectly by these plates.

The casing 28 fits between the plates and is hinged at 29 to permit its top and left side to swing up and to the right to permit access to the machine. The hinged part of the casing is secured when closed by the thumb turn 30.

The supply roll R of pressure-sensitive adhesive tape T is carried on the tape roll holder drum 31 which may be of a size to receive the standard commercial sizes of rolls of pressure-sensitive adhesive tape such as that sold under the trademark "Scotch," but if desired, the machine may be provided with several interchangeable drums of varying sizes. The periphery of drum 31 is provided at intervals with ridges 31a (Figure 2) extending parallel to the drum's axis so as to insure a tight fit between the drum and the roll of tape notwithstanding any possible slight variance in actual size of rolls that are used from time to time. The ridges also help to prevent slipping.

Tape holder drum 31 is rotatably mounted by means of axle-bolt 32, on the arm 24a which is an extension of the front plate 24. The drum is journaled on an unthreaded portion of the axle-bolt which extends between the knurled bolthead and a flange (not shown). The end of the axle-bolt is threaded into the arm 24a and is equipped with lock-nut 33. The drum 31 and the draft wheel 45 are aligned with each other and their axes are preferably parallel.

An idler roller 34 around which the tape may pass as it is led from the supply roll R to the wheel 45, is journaled on a suitable shaft that is fixed in the front plate 24 below the wheel. A second idler roller 35, similarly mounted, may be provided to the left of the first, to cause the tape to contact a greater length of the wheel's periphery, when desired.

To assist further in providing adequate adherence of the tape to the periphery of the wheel, a rubber presser roller 36 is mounted adjacent the wheel at a point in its travel where it is carrying the uncut tape. To permit adjustment of the pressure of the presser roller against the wheel, there is provided inside the casing a tension arm 37 (Figure 2) extending parallel with the front plate and pivotally mounted on a shaft 38 which is fixed in the front plate 24 perpendicular thereto. The right end of the arm (the left end in Figure 2) carries a fixed shaft 39 which extends through an enlarged opening 40 in the front plate 24, perpendicular thereto, and on which is journaled the presser roller 36. The other end of the arm is impelled downwardly by the vertical spiral spring 41, thereby pressing the roller 36 upwardly against the tape that is trained around the periphery of the wheel. The adjustable upright stop screw 42 in the base 21 below the left end (the right end in Figure 2) of the arm 37 limits the extent to which the spring 41 can pull the arm down.

The draft wheel or drum 45 which draws the tape from the supply roll R through the machine, severs it by coacting with a member hereinafter described and then holds the severed length ready for removal, is fixed on a rotatable shaft 46. The wheel's periphery is divided into two segments 45' and 45" by two spaces or breaks or niches or recesses in the rim of the wheel. The first recess ab extends between the points designated in Figure 1 as a and b; the second recess cd between c and d. Segment 45' thus extends from a to d and segment 45" from b to c. Both segments are shown as being knurled and circumferentially grooved. This serves to spread the points of contact of the tacky side of the tape over a wide space to provide a more even pull and at the same time to reduce the actual area of the adhesive surface that is contacted so as to facilitate ready removal of the tape from the wheel.

Severing elements in the form of cutting edges x and y are removably fixed by suitable bolts 47 and 47' in the recesses ab and cd respectively. The cutter x is substantially spaced from the adjacent edge a of segment 45' and from the adjacent edge b of segment 45"; similarly cutter y is spaced from the edge c of segment 45" and from the edge d of segment 45'. The cutters x and y may be at any angle convenient for their coaction with the complementary severing element which is adjacent to the wheel. In the present embodiment the cutting edges x and y are straight edges and are parallel to the wheel's axis.

A complementary severing element designed to coact with the cutting edges x and y is provided in the form of a roller 50 mounted adjacent the wheel 45 to act as an anvil member against which the edges *x* and *y* are successively pressed as the wheel turns.

The cutting roller 50 and the cutting edges *x* and *y* may be shaped and/or positioned so that a cutting edge contacts the roller at only a single point at any one time with the result that in operation, an edge contacts the roller point by point along the edge's length, which is preferable to having the full length of the edge contact the roller all at once. In the present embodiment this is accomplished by positioning the cylindrical cutting roller 50 in angular relation to the straight edges *x* and *y*.

This angular relation makes it necessary for a cutting edge or the cutting roller or both to move for some distance in relation to each other before the full length of any one cutting edge *x* or *y* can be brought into contact point by point with the cutting roller 50. In the present embodiment substantially all of the relative movement of the two parts past each other is effected by movement of the cutting edges *x* or *y*.

Since each cutting edge thus moves for some distance in a circular path while it is in contact with the cutting roller, and since the cutting roller is preferably made of a relatively unyielding substance, and since it is preferable to have the full length of each cutting edge contacting the cutting roller at a substantially uniform pressure and at a pressure approximately equal to that of the other cutting edges, and for other reasons, the cutting roller is held yieldably rather than rigidly in its normal position.

The roller 50 is journaled on the roller shaft 51, which in turn is removably fixed in a U-shaped yoke 52, the latter being fixed on the yoke shaft 53 which passes through the bight of the yoke and which is journaled in the front and rear plates 24 and 25 parallel with the axis of the wheel 45. The front end of the roller shaft 51 may be formed into a thumb turn, and the rear end be in threaded engagement with the rear arm of the yoke whereby it may be removed to permit removal of the cutting roller for replacement or resurfacing. The above mentioned angular relation between the roller and the cutting edges is secured in this embodiment by making one arm of the yoke longer than the other, although the desired angularity may be secured by other means, for example by placing the yoke-supporting shaft 53 at an angle, so long as the full width of the tape being cut is pressed between the cutting edges *x* or *y* and the roller 50 preferably at a substantially uniform pressure.

A horizontal positioning arm 54 is fixed on the yoke-supporting shaft 53 inside the casing near the front plate 24 (Figures 2 and 3). The free end of the arm is contacted upon its upper side by the lower end of the upper vertical adjusting rod 55' which pierces a bracket 24b in threaded engagement therewith. The end of the rod, by stopping upward movement of the positioning arm 54, limits the swing of the cutting roller toward the wheel 45. It is preferably adjusted so that the roller will come to rest at the nearest point to the wheel 45 to which it comes at any time during the operation of the machine.

Similarly the swing of the cutting roller away from the wheel when it is being pressed by the cutter *x* or *y* during the time of severing, is yieldingly limited by the cushion 56 which is of a resilient material such as rubber (or which may be a spring) and which contacts the under side of the positioning arm 54. The cushion is held by the enlarged upper end of the lower vertical adjusting rod 55", the latter being supported by a bracket 24c in threaded engagement therewith. The preferred adjustment is to set up a tension sufficient to exert a pressure between the severing edges *x* or *y* and the roller 50 during their time of contact that will sever the tape T.

The edges *x* and *y* are set out in this machine to extend beyond the wheel's periphery so that as the wheel turns, the roller 50 will not contact the periphery (nor the tape carried on it) when the roller is positioned to contact the edges with pressure sufficient to sever the tape.

The anvil member 50 is preferably made of relatively hard material, though preferably softer than the cutting edges *x* and *y*. In the present embodiment, it is of steel. Brass, copper, aluminum, and other softer materials tend to become scored too rapidly by the cutters. The roller's periphery is preferably smooth. It gradually becomes scored by the cutting edges but will stand considerable use before needing replacement.

To rotate the wheel 45, a gear 59 is keyed to the shaft 46 on which the wheel is fixed, the shaft being journaled in the front and rear plates 24—25. Gear 59 is rotated clockwise (Figure 2) by pinion 60 fixed to power shaft 61 which is journaled in front plate 24 and turned by the worm wheel shaft of a worm gear reduction motor M.

An auxiliary vertical switch-carrying frame 24d is fixed to the rear side of the front frame 24, spaced therefrom and parallel thereto. Bolts 62 which hold the frame 24d to the frame 24 serve also to fix the motor M to the rear side of frame 24d.

Means for initiating a dispensing cycle is provided in the form of control means comprising a switch in the circuit that supplies power to the motor and a switch-actuating assembly or tripping means that is carried on a horizontal trip shaft 63.

Above the wheel 45 a vertical trip rod 64, with its upper end bent over forwardly to a horizontal position, is placed so that its bent part is engaged by a severed piece of tape as it is being removed from the wheel, the object being to move the trip rod 64 sufficiently to actuate a motor switch by the pressure of the tape against the rod upon removal of the severed piece for use.

The trip rod 64 is held by its lower end on the front end of the switch trip shaft 63. A bracket 24e is fixed to the rear of the frame 24d. The shaft 63 is journaled in frames 24, 24d and bracket 24e. The "on" switch arm 65 is fixed to the trip shaft 63 between the switch frame 24d and the bracket 24e so that upward movement of trip rod 64 moves the leaf spring switch arm 65 upwardly to press the "on" point 66 of reset "micro switch" 67 (attached to frame 24d). By a "reset" switch is means one having two pins, one of which is pressed to make the circuit and the other to break it, such that when the "on" pin is pressed, the switch remains closed until the "off" pin is pressed, whereupon the switch opens and the "on" pin is raised to initial open position.

After the switch 67 is closed, the circuit (Figure 6) is complete and it remains so until broken by pressure of the "off" switch arm 69 against the "off" pin 68. Leaf spring switch arm 69 is mounted so as to be pressed against the "off" pin 68 by switch cam 70' and 70", said cams being adjustably mounted on the wheel shaft 46 in a position to shut the motor off in time for it to coast to a stop just after a piece of tape has been severed and the full length of the cut piece is on the "top" half of the wheel with both its ends within reach of the operator.

*Mode of operation*

A roll R of pressure-sensitive adhesive tape T is mounted on the drum 31, positioned so that when the tape is led towards the wheel 45, the adhesive side faces down. The axle-bolt 32 on which drum 31 is journaled, is moved toward the front or rear of the machine by turning its thumb-turn head (Figure 3) until the roll R is in line with the cutting edges $x$ and $y$ on the wheel 45.

The tape is led from the roll R to the left and down around idler roller 34 (and around idler roller 35 also, if necessary to secure more adhesive contact with the wheel 45) and then to the right and upwardly around the under side of the wheel 45 between the pressure roller 36 and the wheel up to a point beyond the point $b$ (Figure 1). Pressure of the roller 36 against the tape is adjusted by turning the stop screw 42 (Figure 2) upwardly against the tension arm 37 for less pressure and downwardly for more pressure until the adhesive contact between the tape and the wheel's periphery is sufficiently great to enable the wheel to withdraw the tape from the supply roll but not great enough to hinder easy removal of the severed pieces. Movement of the trip rod 64 upwardly by hand will cause the machine to move through one dispensing cycle (a half turn of wheel 45) after which a severed length will occupy the position of the piece T—1 as shown in Figure 1, and the machine is then ready for normal operation.

The operator grasps one or both of the ends of the piece T—1 which project in either direction beyond the limits of the peripheral segment $ad$, and removes the piece by drawing it upwardly. While being thus withdrawn the non-tacky side of the piece contacts the downturned upper end of the trip rod 64 and impels it upwardly. This motion is imparted through switch trip shaft 63 to the "on" switch arm 65 (Figure 2) which moves upwardly and presses the "on" point 66 of switch 67 to start the motor M. The motor, through gear and pinion 59—60 turns wheel 45 counter-clockwise (Figure 1) and the tape is thereby withdrawn from the supply roll. As the cutting edge $y$ approaches the roller 50 the tape is led over it so that when the wheel carries $y$ past the roller the tape is severed across its entire width in a smooth straight cut by reason of its being pressed between the edge $y$ and the roller 50. At or about this time the cam 70 (Figure 2) will be turned to depress the "off" switch arm 69 whereby the "off" point 68 of switch 67 is pressed and the motor M will coast to a stop, which, by adjustment of the cam, can be made to occur just after the edge $y$ has passed the roller 50, so that it will occupy the place occupied by the edge $x$ in Figure 1, and the newly severed piece of tape will occupy the place now occupied by the length T—1 in Figure 1.

It will be apparent that very accurate measurement of lengths of tape can be secured by machines embodying this invention. Such accuracy is of especial advantage when dispensing tape that is printed to form a series of labels, stickers, trade-mark emblems, etc.

The wheel 45 may be equipped with any number of cutters to dispense any desired length of tape. The diameter of the wheel 45 in the illustrated machine is about 9 inches and since there are two cutters, $x$ and $y$, spaced 180° apart, the length of each dispensed piece is about 15 inches.

It will also be apparent that the severing means here employed provides a smooth straight cut and the smoothness of the severing members prevents their becoming clogged with adhesive.

"Tape" and "sheet material" are regarded as being interchangeable terms, that is, "tape" is used herein as a generic term to refer to sheets that are long in proportion to width.

The illustrated machine is entirely automatic, nothing being required of an operator except that he remove the pieces of tape needed.

Dispenser units embodying the principles of my invention may be built into packaging, labeling and wrapping machines, etc.

I claim:

1. In a device adapted to dispense pressure-sensitive adhesive tape in relatively long lengths of the order of approximately five inches or greater, means for holding a supply roll of tape, a rotatable wheel whose periphery is adapted to grip the tape by adhesive contact therewith and withdraw it from the roll when it is trained around the wheel, the periphery being divided by recesses into fixed segments of sufficient extent to fix adhesively a majority of the length of a piece of the severed tape, a severing edge in each of a plurality of the recesses, an edge being spaced from the adjacent edge by a peripheral distance of the order of approximately five inches or greater, each edge being sufficiently spaced from at least one of the two adjacent segments to provide space for grasping an end portion of a severed piece of tape, and each edge being positioned so that the tape passes over it when it is trained around the wheel, an anvil member adjacent the wheel positioned so that the severing edges are successively pressed against the anvil as the wheel rotates thereby severing the tape with a majority of the length of the severed portion still held and supported in an accessible position by the peripheral surface by reason of the tape's adherence thereto with an end free from contact therewith to permit such end to be grasped for removal.

2. The device of claim 1 with power driving means for intermittent operation of the dispenser in dispensing cycles whereby successive pieces of severed tape are brought to rest at a dispensing station in step-by-step fashion, including control means adapted to be actuated in response to the removal of a severed length of tape, so that upon such removal the dispenser is set in operation to dispense the next length of tape.

3. The device of claim 1 in which the anvil member is a rotatably mounted cylinder positioned angularly in relation to the said cutting edges and is yieldably mounted adjacent the cutter wheel so that the pressure of said severing edges against said cylinder will be substantially uniform during the periods of contact therewith.

ARTHUR A. ANDERSON.